(12) United States Patent
Furukawa et al.

(10) Patent No.: US 6,198,465 B1
(45) Date of Patent: Mar. 6, 2001

(54) SYSTEM FOR PRODUCING A LIQUID CRYSTAL DRIVING SIGNAL

(75) Inventors: Junichi Furukawa; Yoshitsugu Araki, both of Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/084,316

(22) Filed: May 26, 1998

(30) Foreign Application Priority Data

May 27, 1997 (JP) ..................................... 9-153033

(51) Int. Cl.⁷ ....................................................... G09G 3/36
(52) U.S. Cl. ........................... 345/94; 345/98; 369/44.23; 369/112
(58) Field of Search ................................. 345/98, 99, 100, 345/88, 85, 48, 87; 348/791; 349/61, 65, 69, 70, 106; 369/44.23, 112, 94, 58

(56) References Cited

U.S. PATENT DOCUMENTS 5,526,058 * 6/1996 Sano et al. ............................. 348/647
5,793,735 * 8/1998 Oono ..................................... 369/116
5,949,393 * 9/1999 Sakai et al. ............................ 345/74

FOREIGN PATENT DOCUMENTS 0 537 904 A2 * 10/1991 (EP) ......................................... 93/16

OTHER PUBLICATIONS

Japanese Patent Application Publication No. 9–128785, by Otaki Masaru et al., dated May 16, 1997.

Abstract of Japanese Patent Application Publication No. 9–128785, by Otaki Masaru et al., dated May 16, 1997.

* cited by examiner

Primary Examiner—Vijay Shankar
Assistant Examiner—Mansour M. Said
(74) Attorney, Agent, or Firm—Arent Fox Kintner Plotkin & Kahn, PLLC

(57) ABSTRACT

A low pass filter is provided for limiting a frequency band of an oscillating signal. A CPU is provided for producing a control signal for setting a cutoff frequency of the low pass filter so as to change an amplitude of the output signal of the low pass filter in accordance with a refractive index at each of the unit electrode of the liquid crystal panel.

5 Claims, 8 Drawing Sheets

SYSTEM FOR PRODUCING A LIQUID CRYSTAL DRIVING SIGNAL

BACKGROUND OF THE INVENTION

The present invention relates to a system for producing a liquid crystal driving signal and an optical disc reproducing system provided with the system for producing a liquid crystal driving signal.

Recently, the DVD (Digital Versatile Disc) having a large capacity larger than that of the compact disc has been proposed. Since the DVD has a high density, the tilt angle margin of the disc at the reproducing thereof is small. Therefore it is desirable to provide a control means for adjusting the tilt angle in the reproducing system.

The assignee of the present invention proposed a system for correcting the wavefront aberration by using a liquid crystal panel, the aberration is caused by the inclination of the thickness of the disc, in the Japanese Patent Application Laid Open Publication 9-128785.

FIG. 6 shows an optical disc reproducing system using the principle disclosed in the publication. A laser beam emitted from a laser 1 is reflected from a half mirror 2, passes through a liquid crystal panel 3 and applied to an optical disc 5 by an objective 4 to form a spot on the disc.

A laser beam reflected from the optical disc 5 passes through the objective 4, liquid crystal panel 3, and half mirror 2, and condensed on a photo-detector 7 by a condenser lens 6. Thus, a pickup is composed.

A tilt sensor 8 is provided adjacent the pickup for detecting the tilt angle of the disc 5. The tilt sensor 8 has one light emitter and two photo-detectors which receive light reflected from the disc 5. Outputs of the two photo-detectors are applied to an adder 10 which produces a difference of the outputs as a tilt error signal. The error signal is fed to an A/D converter 11.

A CPU 17 applies a control signal based on the error signal to a gain adjuster 13. The gain adjuster 13 adjusts the amplitude (gain) of a standard signal fed from an oscillator 12 in accordance with the control signal. The standard signal has, for example, a duty ratio of 50%. The adjusted standard signal is applied to the liquid crystal panel 3 as a driving signal. The gain adjuster 13 comprises a plurality of adjusting devices, each of which is connected to each electrode piece of the liquid crystal panel so as to adjust the tilt angle of the disc 5 as described hereinafter.

FIG. 7a is a sectional view of the liquid crystal panel 3, and FIG. 7b is a plan view of the panel. The liquid crystal panel 3 comprises opposite transparent glass substrates 301a and 301b, transparent electrodes 302a and 302b evaporated on the substrates 301a, 301b, orientation films 303a and 303b, and liquid crystal 303 sealed between the orientation films.

At least one of the electrodes 302a and 302b comprises a plurality of electrode pieces 302c arranged in matrix as shown in FIG. 7b. Each of the electrode pieces 302c is connected to a corresponding gain adjuster 13.

FIG. 8 shows a molecule M of the liquid crystal 304. The molecule M has a refractive index of n1 in the optical axis and a refractive index of n2 in the direction perpendicular to the optical axis. Namely, the liquid crystal is a double refraction crystal having different refractive indexes in direction. For example, the liquid crystal is nematic liquid crystal.

FIGS. 9a to 9c show various directions of molecules M when applied voltage is changed.

FIG. 9a shows the direction when no voltage is applied. FIGS. 9b and 9c shows directions when alternating voltages e1 and e2 are applied (e1<e2).

As shown in figures, the direction of the molecule changes from the horizontal direction to the vertical direction.

Each of FIGS. 9a to 9c shows the state when equal voltages are applied to all electrode pieces of the liquid crystal 3 so that the directions of the molecules in each figure is the same. However, if the voltage applied to each electrode piece is different from that of other pieces, the direction necessarily changes. Thus, the refractive index of each molecule can be changed between n1 and n2.

When the refractive index of the liquid crystal is changed, the light beam passing through the liquid crystal changes in the optical path of the difference given by the following formula.

$$\text{Optical path difference: } \Delta n \cdot d$$

where $\Delta n$ is the change quantity of the refractive index and d is the thickness of the liquid crystal.

This means that a phase difference obtained by the following formula is given to the light beam passing through the liquid crystal.

$$\text{Phase difference: } \Delta n \cdot d (2\pi/\lambda)$$

where $\lambda$ is the wavelength of the light beam.

Therefore, it is possible to correct the wavefront aberration caused by the inclination of the disc by controlling the refractive index n of each part of the liquid crystal so as to cancel the aberration generating in the objective 4.

However, in the liquid crystal driving signal producing system, it is a problem to realize the controlling of the amplitude of the liquid crystal driving signal.

SUMMARY OF THE INVENTION

An object of the present invention is to provide a novel system for producing a liquid crystal driving signal.

According to the present invention, there is provided a system for producing a driving signal for a liquid crystal panel, for correcting a wavefront aberration in an optical system for an optical disc, the liquid crystal panel having a plurality of unit electrodes.

The system comprises an oscillator, a low pass filter for limiting a frequency band of an oscillating signal produced from the oscillator, and control means for producing a control signal for setting a cutoff frequency of the low pass filter so as to change an amplitude of the output signal of the low pass filter in accordance with a refractive index at each of the unit electrode of the liquid crystal panel.

The system further comprises a level shifter for shifting the level of the oscillation signal from the oscillator, a tilt sensor for detecting a tilt of the optical disc and for producing a tilt signal, the control means is provided for producing the control signal dependent on the tilt signal so as to correct the wavefront aberration.

These and other objects and features of the present invention will become more apparent from the following detailed description with reference to the accompanying drawings.

BRIEF DESCRIPTION OF DRAWINGS

FIG. 7b is a plan view of the panel of FIG. 7a;

DETAILED DESCRIPTION OF THE PREFERRED EMBODIMENT

Figure 1:
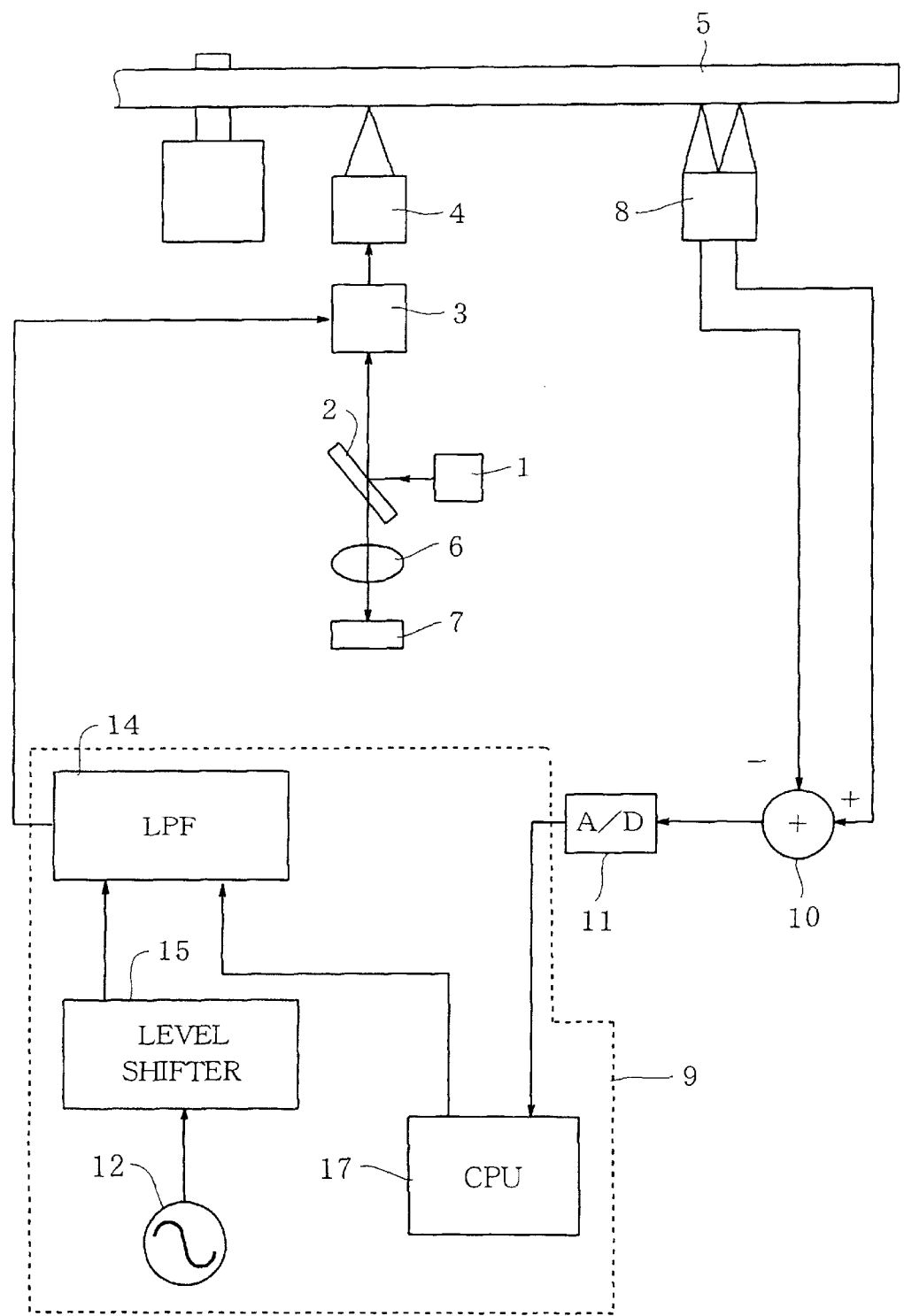
FIG. 1 is a block diagram of an optical disc reproducing system provided with a liquid crystal driving signal producing system of a first embodiment of the present invention.
Figure 6:
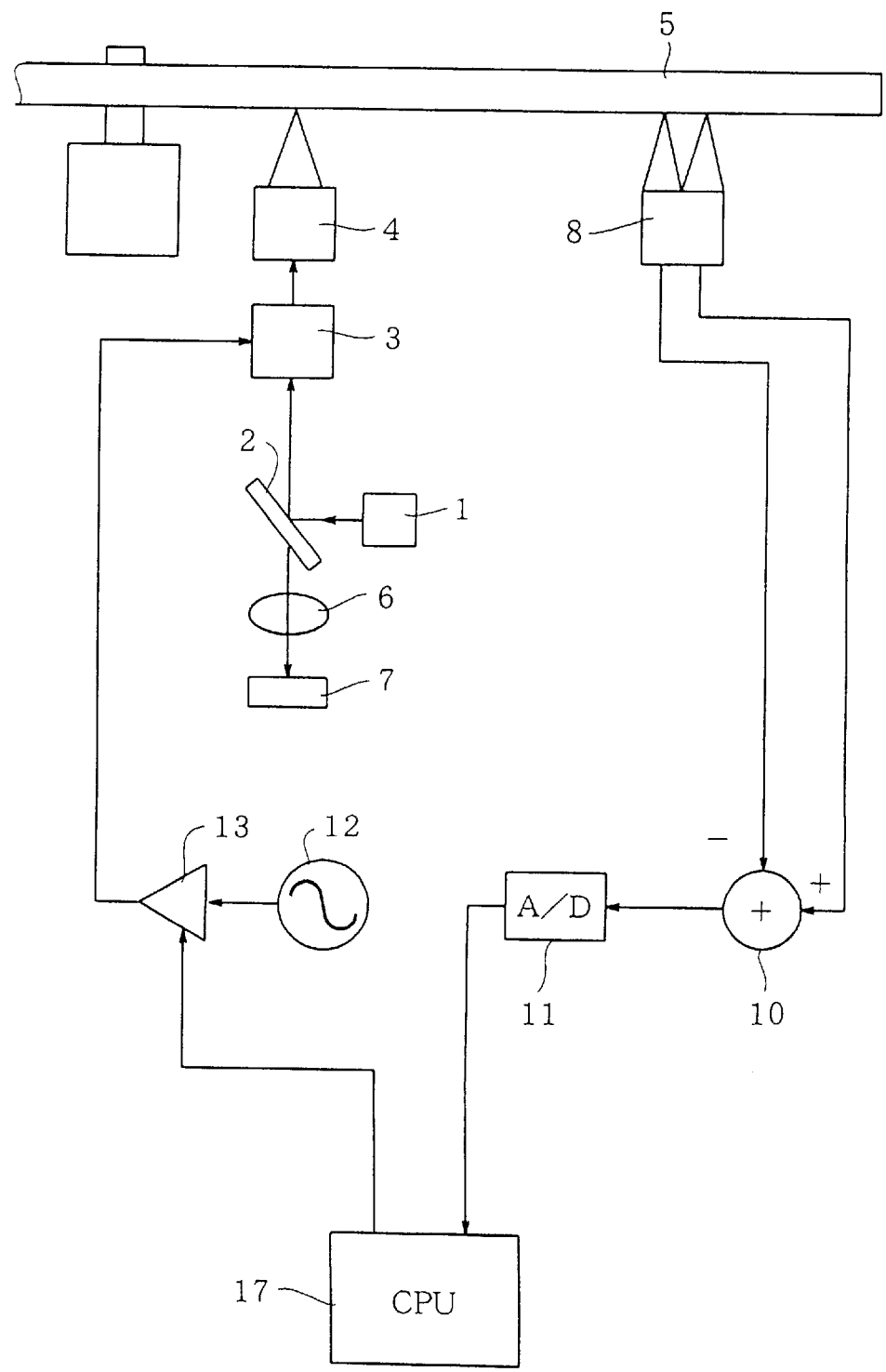
FIG. 6 shows a conventional optical disc reproducing system.
Figure 7A:
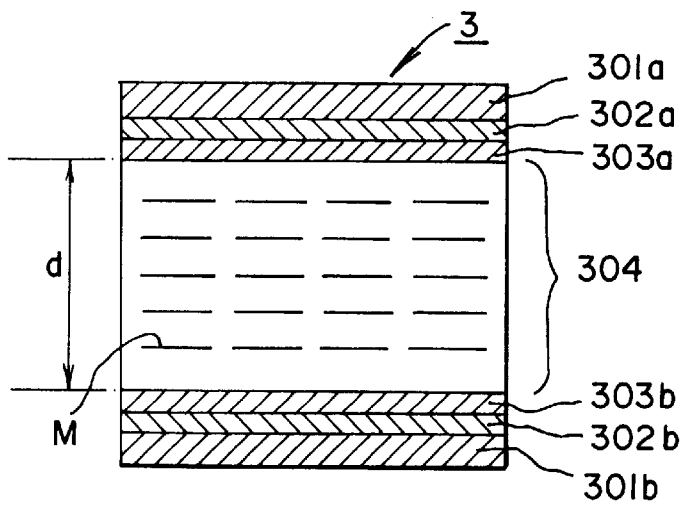
FIG. 7a is a sectional view of a conventional liquid crystal panel.
Figure 7B:
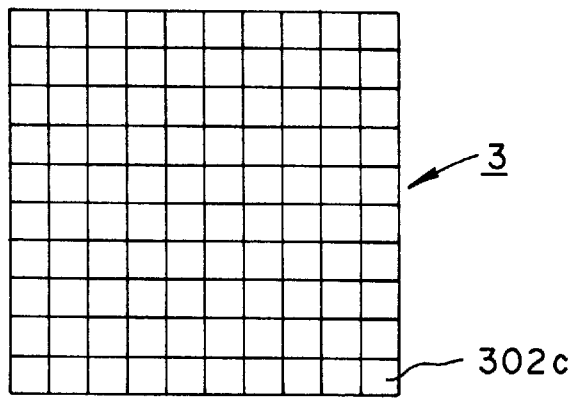
Figure 8:
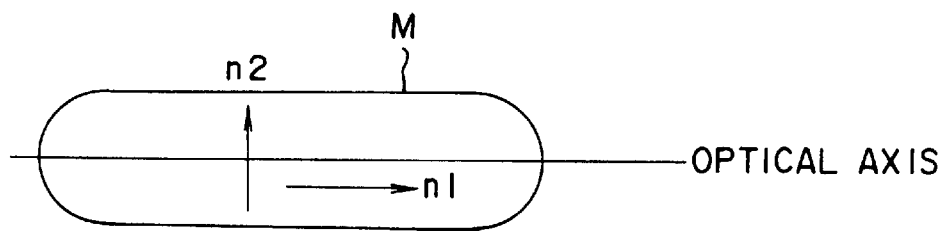
FIG. 8 shows a molecule of the liquid crystal.
Figure 9A:
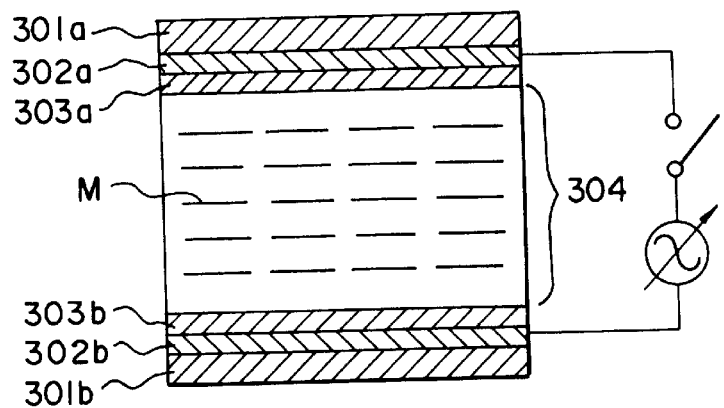
FIG. 9a shows a direction of the molecule when no voltage is applied.
Figure 9B:
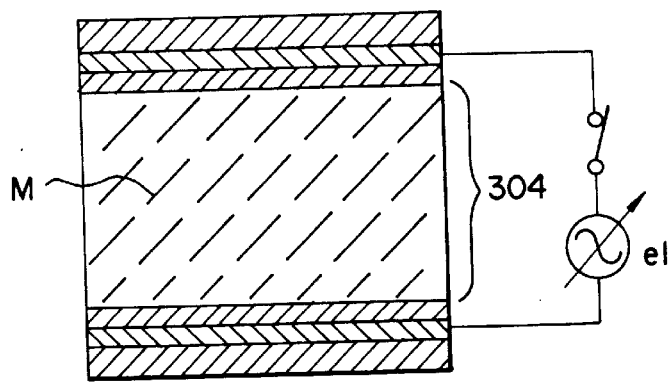
FIGS. 9b and 9c shows directions of the molecule when alternating voltages are applied.
Figure 9C:
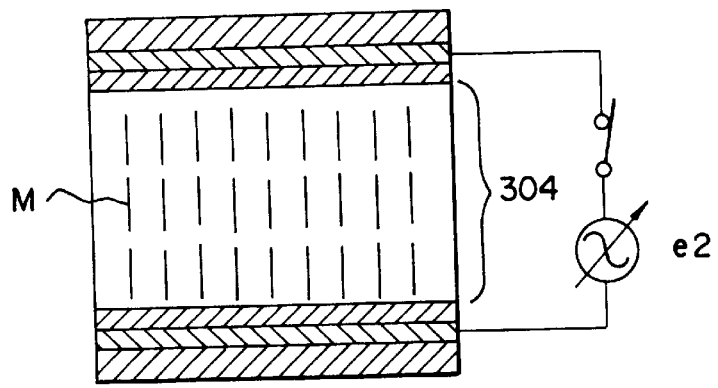

FIG. 1 shows a block diagram of an optical disc reproducing system provided with a liquid crystal driving signal producing system of a first embodiment of the present invention. The same parts as the system of FIG. 6 are identified with the same reference numbers as FIG. 6, thereby omitting detailed description thereof. The system has a liquid crystal driving signal producing system 9.

The system 9 comprises a low pass filter 14, level shifter 15, oscillator 12 and CPU 17.

The oscillator 12 produces pulses having a duty ratio of 50% as a reference clock signal for an optical disc reproducing system.

Figure 5:
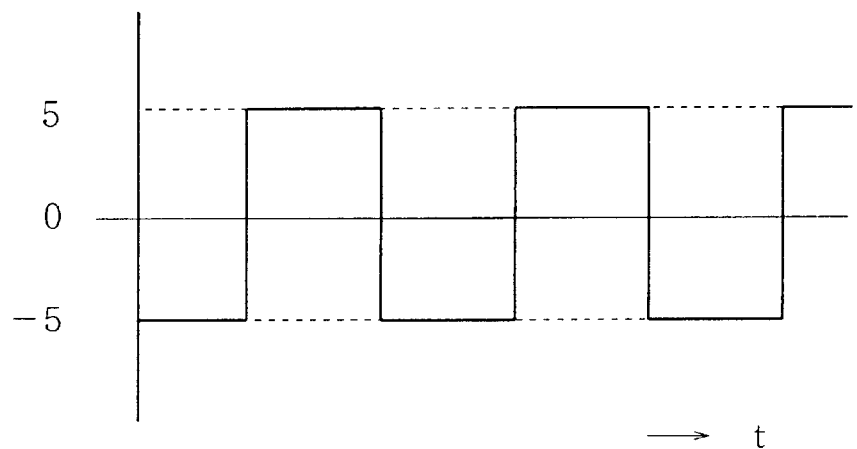
FIG. 5a shows a waveform of an output signal of an oscillator.
FIG. 5b shows an output signal of a level shifter.
Figure 5:
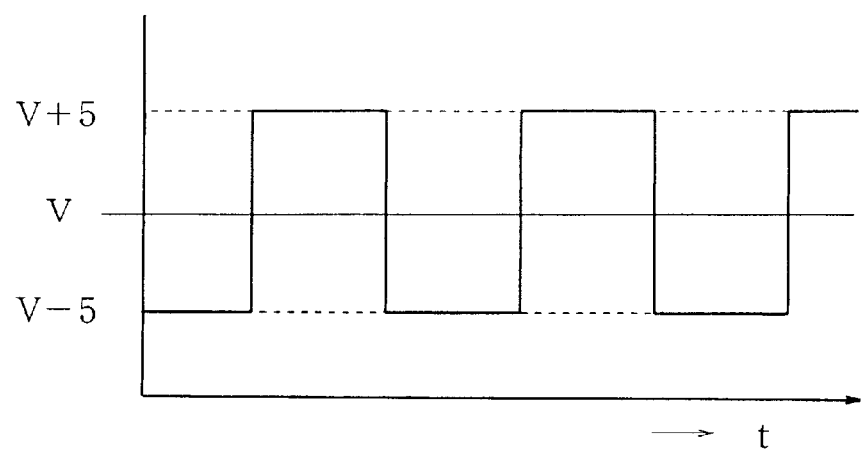

The level shifter 15 shifts the level of the output signal of the oscillator 12 so that the middle potential of the output signal coincides with the middle potential (hereinafter called standard potential) of the alternating current for driving the liquid crystal panel 3. More particularly, as shown in FIG. 5a, the middle potential O of the output signal of the oscillator is shifted to the standard potential V of FIG. 5b. The standard potential is at the ground level. Since the positive potential (V+5) is equal to the negative potential (V−5), the alternating current applied to the unit electrode of the liquid crystal panel does not include a direct current component.

The liquid crystal has a characteristic that the liquid crystal is broken when an alternating current including a direct current component is applied thereto. However, the driving signal of the present invention does not include a direct current component as described above.

The output signal of the level shifter 15 is applied to the low pass filter 14.

Figure 2:
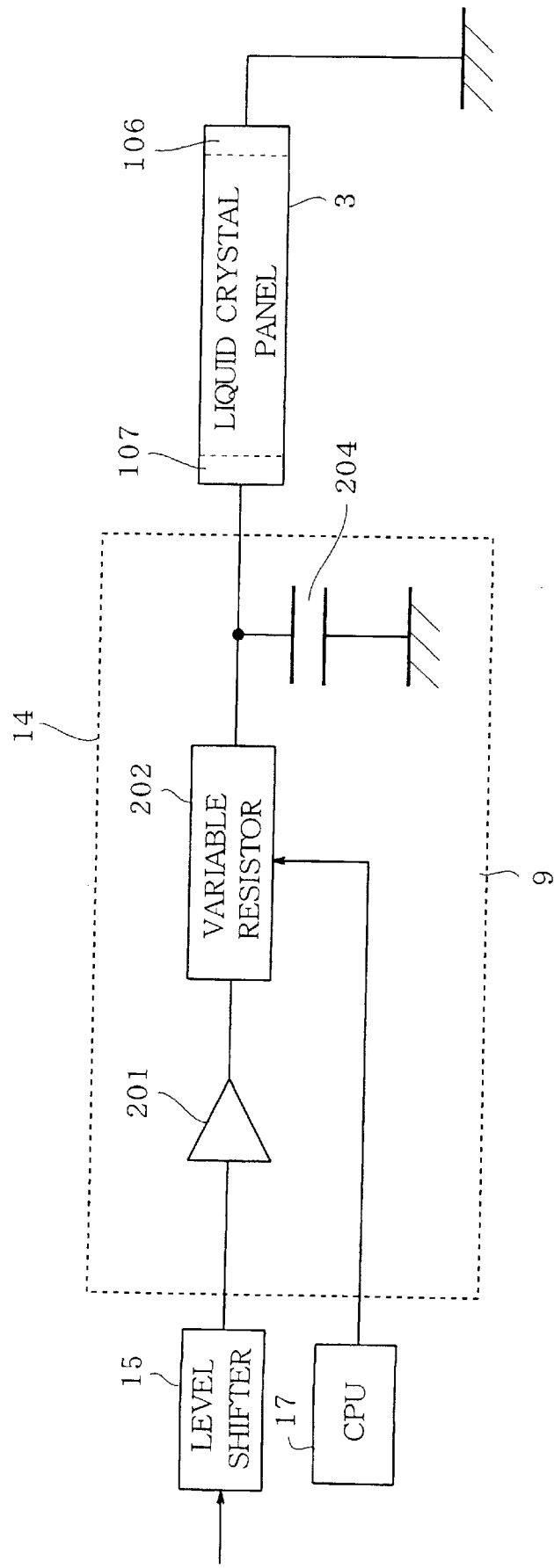
FIG. 2 is a block diagram of a low pass filter.

FIG. 2 is a block diagram of the low pass filter 14. The low pass filter 14 comprises a buffer amplifier 201 applied with the output signal of the level shifter 15, a variable resistor 202 connected to the output of the buffer amplifier 201, and a capacitor 204. By the variable resistor 202 and the capacitor 204, the low pass filter 14 is composed. The output signal of the filter is applied to a unit electrode 107 opposite to a unit electrode 106.

Figure 3:
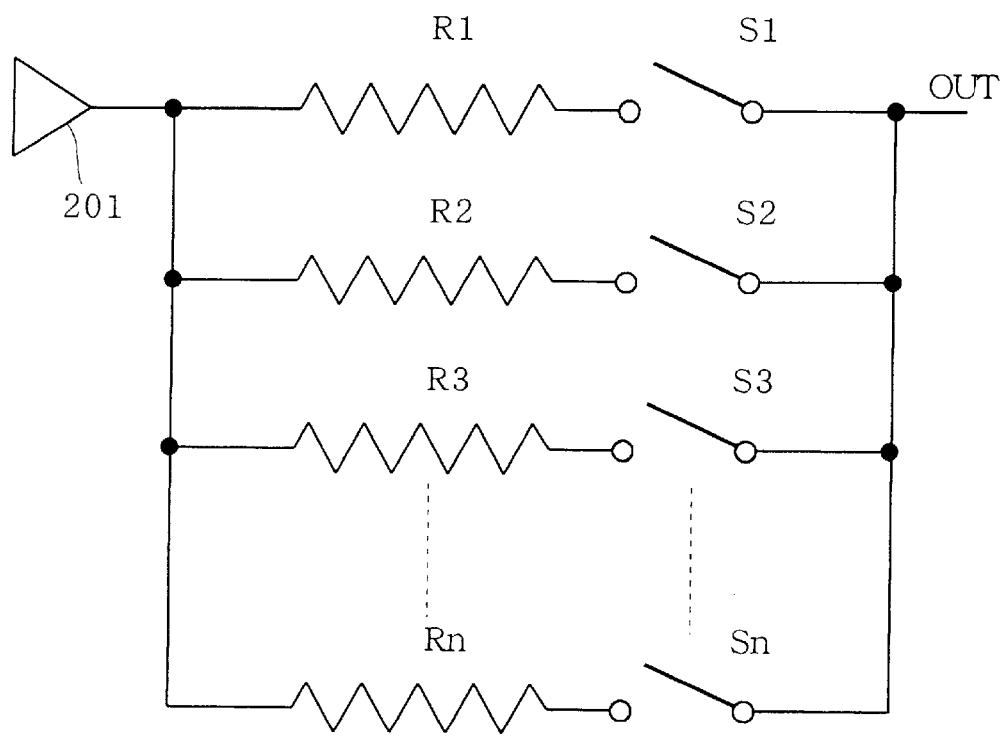
FIG. 3 shows a variable resistor circuit of a variable resistor.
Figure 3:
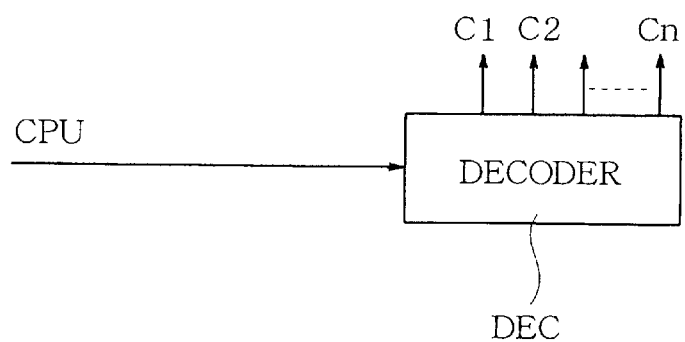

FIG. 3 shows a variable resistor circuit of the variable resistor 202. The variable resistor circuit has a plurality of resistors R1 . . . Rn and switches S1 . . . Sn for respective resistors, these elements being parallely connected.

In operation, the CPU obtains a cutoff frequency of the low pass filter necessary for producing a liquid crystal driving quantity corresponding to the refractive index to be set, based on the output signal of the tilt sensor 8. Thereafter, the CPU applies a control signal or a plurality of control signals for setting the cutoff frequency to the low pass filter 14. The control signal or signals is or are applied to a switch S or switches of FIG. 3 through the decoder DEC so as to close the switches.

By selecting the switches S, various cutoff frequencies can be obtained. Thus, a desired cutoff frequency is obtained for each unit electrode, and applied to a corresponding unit electrode.

Figure 4:
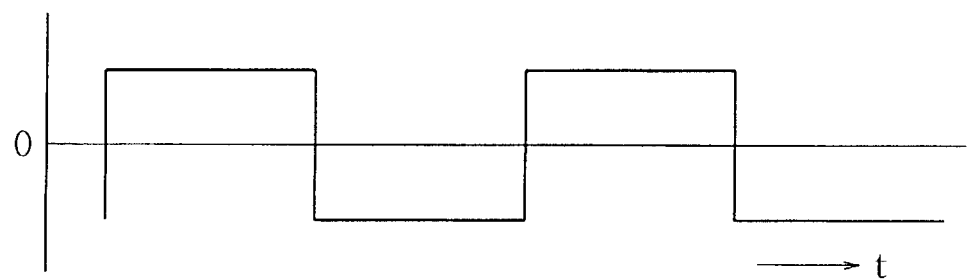
FIG. 4a shows an input waveform of a buffer amplifier.
FIGS. 4b and 4c show output waveforms of a low pass filter.
Figure 4:
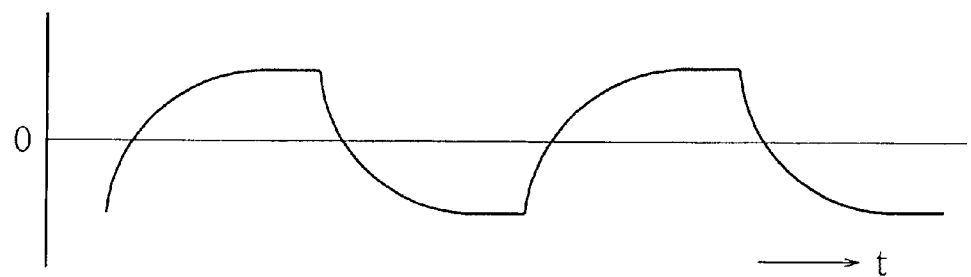
Figure 4:
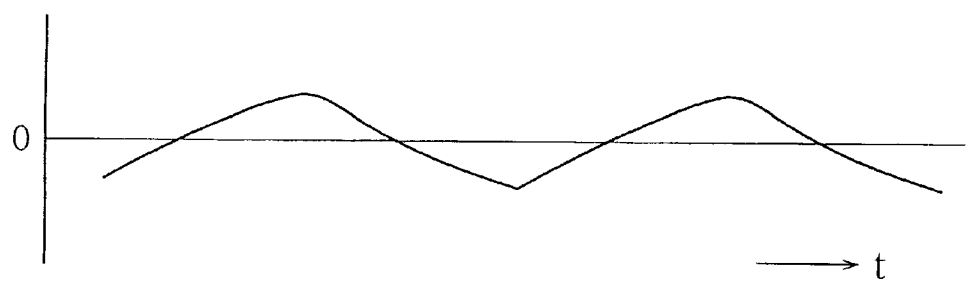

FIG. 4a shows an input waveform of the buffer amplifier 201, and FIGS. 4b and 4c show output waveforms of the low pass filter 14.

FIG. 4b is a case when the cutoff frequency is high, FIG. 4c is a waveform when the cutoff frequency is low. The amplitude of the wave becomes low as the cutoff frequency becomes low, so that the amplitude of the liquid crystal driving signal becomes small. Therefore, the cutoff frequency is determined in dependency on the refractive index to be set so as to correct the tilt of the optical disc.

Although in the above described system, the output signal of the filter 14 is directly applied to the liquid crystal, a suitable amplifier may be disposed before or after the filter. Furthermore, the system can be applied to an optical disc recording system.

In accordance with the present invention, by setting the cutoff frequency of the low pass filter to a proper value, the refractive index of the liquid crystal is set so as to ensure the correction of the wavefront aberration.

While the invention has been described in conjunction with preferred specific embodiment thereof, it will be understood that this description is intended to illustrate and not limit the scope of the invention, which is defined by the following claims.

What is claimed is:

1. A system for producing a liquid crystal driving signal, the system comprising:
    an oscillator;
    a low pass filter for limiting a frequency band of an oscillation signal output from the oscillator and outputting the band-limited oscillation signal as the liquid crystal driving signal; and
    a control section for controlling a cutoff frequency of the low pass filter in accordance with a refractive index to be set for a liquid crystal.

2. The system according to claim 1, further comprising a level shifter, provided between the oscillator and the low pass filter, for shifting the level of the oscillation signal from the oscillator.

3. A disc playing apparatus comprising:
    a liquid crystal panel, located on an optical axis of a laser beam, for correcting an aberration;
    an oscillator;
    a low pass filter for limiting a frequency band of an oscillation signal output from the oscillator and outputting the band-limited oscillation signal as a liquid crystal driving signal; and a control section for determining a refractive index to be set for a liquid crystal panel in order to correct an aberration produced on a disc and controlling a cutoff frequency of the low pass filter in accordance with the refractive index.

4. The disc playing apparatus according to claim 3, further comprising:

a tilt sensor for detecting a tilt angle between an optical axis of the laser beam and the disc and the aberration detection means detects an aberration produced by the tilt angle.

5. The disc playing apparatus according to claim 3, further comprising:

a level shifter, provided between the oscillator and the low pass filter, for shifting the level of the oscillation signal from the oscillator.

* * * * *